US012750898B2

(12) United States Patent
Chong

(10) Patent No.: US 12,750,898 B2
(45) Date of Patent: Sep. 29, 2026

(54) SENSING SERVICE SHARED CHANNEL ESTABLISHING METHOD AND DEVICE

(71) Applicant: VIVO MOBILE COMMUNICATION CO., LTD., Dongguan (CN)

(72) Inventor: Weiwei Chong, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 285 days.

(21) Appl. No.: 18/673,999

(22) Filed: May 24, 2024

(65) Prior Publication Data

US 2024/0324036 A1 Sep. 26, 2024

Related U.S. Application Data

(63) Continuation of application No. PCT/CN2022/133158, filed on Nov. 21, 2022.

(30) Foreign Application Priority Data

Nov. 25, 2021 (CN) ........................ 202111416176.1

(51) Int. Cl.

*H04W 76/11* (2018.01)
*H04W 16/14* (2009.01)
*H04W 24/10* (2009.01)

(52) U.S. Cl.

CPC ............ *H04W 76/11* (2018.02); *H04W 24/10* (2013.01)

(58) Field of Classification Search

CPC ....... H04W 76/11; H04W 4/38; H04W 24/10; H04W 16/14; H04W 76/12; H04B 17/382

See application file for complete search history.

(56) References Cited

U.S. PATENT DOCUMENTS 11,765,669 B2 * 9/2023 Nam .................... H04B 7/0452 455/522
12,284,532 B2 * 4/2025 Wanuga ................ H04W 24/08
2014/0080519 A1 3/2014 Ahmed
2017/0208605 A1 7/2017 Ansari et al.
2024/0022927 A1 * 1/2024 Tong ....................... H04W 4/40
2024/0155388 A1 * 5/2024 Jiang ..................... H04W 24/08

(Continued)

FOREIGN PATENT DOCUMENTS

CN 102209328 A 10/2011
CN 110545559 A 12/2019

(Continued)

OTHER PUBLICATIONS

Harish, "Joint design of communication and sensing for Beyond 5G and 6G systems", Nokia Bell Labs, Apr. 19, 2021, 26 pages, XP093097424 [retrieved on Nov. 2, 2023].

*Primary Examiner* — Khawar Iqbal
(74) *Attorney, Agent, or Firm* — The Webb Law Firm

(57) ABSTRACT

A method for establishing a sensing service sharing channel includes a RAN receives a first sensing service establishment request message sent by a SF. The first sensing service establishment request message includes identification information corresponding to the SF. The first RAN establishes a sensing service sharing channel in response to the first sensing service establishment request message, where the sensing service sharing channel is used to transmit sensing measurement data of K sensing services between the SF and the first RAN, and K is a positive integer.

19 Claims, 6 Drawing Sheets

(56) References Cited

U.S. PATENT DOCUMENTS

| | | | | |
|---|---|---|---|---|
| 2024/0205639 | A1* | 6/2024 | Ying | H04W 12/08 |
| 2024/0205652 | A1* | 6/2024 | Ying | H04W 76/10 |
| 2024/0314862 | A1* | 9/2024 | Chong | H04B 17/382 |
| 2024/0406689 | A1* | 12/2024 | Liu | G01S 7/41 |
| 2024/0422654 | A1* | 12/2024 | Mandelli | H04W 48/16 |
| 2024/0430649 | A1* | 12/2024 | Liu | H04W 4/38 |
| 2025/0240606 | A1* | 7/2025 | Liu | G01S 13/86 |

FOREIGN PATENT DOCUMENTS

| | | | |
|---|---|---|---|
| CN | 112689300 | A | 4/2021 |
| CN | 112738758 | A | 4/2021 |
| EP | 4391602 | A1 | 6/2024 |
| WO | 2011121443 | A2 | 10/2011 |
| WO | 2021030685 | A1 | 2/2021 |

* cited by examiner

SENSING SERVICE SHARED CHANNEL ESTABLISHING METHOD AND DEVICE

CROSS-REFERENCE TO RELATED APPLICATIONS

This application is a Bypass Continuation Application of International Patent Application No. PCT/CN2022/133158, filed Nov. 21, 2022, and claims priority to Chinese Patent Application No. 202111416176.1, filed Nov. 25, 2021, the disclosures of which are hereby incorporated by reference in their entireties.

BACKGROUND OF THE INVENTION

Field of the Invention

This application belongs to the field of communication technologies, in particular, to a method and a device for establishing a sensing service sharing channel.

Description of Related Art

A wireless communication network not only provides functions of data communication and transmission, but also provides a sensing function.

SUMMARY OF THE INVENTION

A first aspect provides a method for establishing a sensing service sharing channel. The method includes:

A first radio access network RAN receives a first sensing service establishment request message sent by a sensing function SF, where the first sensing service establishment request message includes identification information corresponding to the SF.

The first RAN establishes a sensing service sharing channel in response to the first sensing service establishment request message, where the sensing service sharing channel is used to transmit sensing measurement data of K sensing services between the SF and the first RAN, and K is a positive integer.

A second aspect provides a method for establishing a sensing service sharing channel. The method includes:

A sensing function SF sends a first sensing service establishment request message to a first radio access network RAN, where the first sensing service establishment request message includes identification information corresponding to the SF; the first sensing service establishment request message is used to indicate the first RAN to establish a sensing service sharing channel between the SF and the first RAN; the sensing service sharing channel is used to transmit sensing measurement data of K sensing services between the SF and the first RAN; and K is a positive integer.

A third aspect provides a method for establishing a sensing service sharing channel. The method includes:

A sensing signal measurement device receives a sensing service control message sent by a sensing function SF, where the sensing service control message includes sensing session identification information SSID of a sensing session corresponding to a sensing service.

The sensing signal measurement device measures a sensing signal based on the sensing service control message, to obtain sensing measurement data of the sensing service.

A fourth aspect provides an apparatus for establishing a sensing service sharing channel, applied to a first radio access network RAN. The apparatus includes:

- a first receiving module, configured to receive a first sensing service establishment request message sent by a sensing function SF, where the first sensing service establishment request message includes identification information corresponding to the SF; and
- a first establishment module, configured to establish a sensing service sharing channel in response to the first sensing service establishment request message, where the sensing service sharing channel is used to transmit sensing measurement data of K sensing services between the SF and the first RAN, and K is a positive integer.

A fifth aspect provides an apparatus for establishing a sensing service sharing channel, applied to a sensing function SF. The apparatus includes:

- a first sending module, configured to send a first sensing service establishment request message to a first radio access network RAN, where the first sensing service establishment request message includes identification information corresponding to the SF; the first sensing service establishment request message is used to indicate the first RAN to establish a sensing service sharing channel between the SF and the first RAN; the sensing service sharing channel is used to transmit sensing measurement data of K sensing services between the SF and the first RAN; and K is a positive integer.

A sixth aspect provides an apparatus for establishing a sensing service sharing channel, applied to a sensing signal measurement device. The apparatus includes:

- a second receiving module, configured to receive a sensing service control message sent by a sensing function SF, where the sensing service control message includes sensing session identification information SSID of a sensing session corresponding to a sensing service; and
- a measurement module, configured to measure a sensing signal based on the sensing service control message, to obtain sensing measurement data of the sensing service.

A seventh aspect provides a first radio access network. The first radio access network includes a processor and a memory. A program or an instruction is stored in the memory and executable on the processor, and when the program or the instruction is executed by the processor, steps of the method according to the first aspect are implemented.

An eighth aspect provides a first radio access network, including a processor and a communication interface. The communication interface is used to receive a first sensing service establishment request message sent by a sensing function SF. The first sensing service establishment request message includes identification information corresponding to the SF.

The processor is configured to establish a sensing service sharing channel in response to the first sensing service establishment request message. The sensing service sharing channel is used to transmit sensing measurement data of K sensing services between the SF and the first RAN, where K is a positive integer.

A ninth aspect provides a sensing function. The sensing function includes a processor and a memory. A program or an instruction is stored in the memory and executable on the processor, and when the program or the instruction is executed by the processor, steps of the method according to the second aspect are implemented.

A tenth aspect provides a sensing function, including a processor and a communication interface. The communication interface is configured to send a first sensing service establishment request message to a first radio access network RAN. The first sensing service establishment request message includes identification information corresponding to the SF. The first sensing service establishment request message is used to indicate the first RAN to establish a sensing service sharing channel between the SF and the first RAN. The sensing service sharing channel is used to transmit sensing measurement data of K sensing services between the SF and the first RAN. K is a positive integer.

An eleventh aspect provides a sensing signal measurement device. The sensing signal measurement device includes a processor and a memory. A program or an instruction is stored in the memory and executable on the processor, and when the program or the instruction is executed by the processor, steps of the method according to the third aspect are implemented.

A twelfth aspect provides a sensing signal measurement device, including a processor and a communication interface. The communication interface is configured to receive a sensing service control message sent by a sensing function SF. The sensing service control message includes sensing session identification information SSID of a sensing session corresponding to a sensing service.

The processor is configured to measure a sensing signal based on the sensing service control message to obtain sensing measurement data of the sensing service.

A thirteenth aspect provides a system for establishing a sensing service sharing channel. The system includes: a first radio access network, a sensing function, and a sensing signal measurement device. The first radio access network may be configured to perform the steps in the first aspect. The sensing function may be configured to perform the steps in the second aspect. The sensing signal measurement device may be configured to perform the steps in the third aspect.

A fourteenth aspect provides a non-transitory readable storage medium. The non-transitory readable storage medium stores a program or an instruction. When the program or the instruction is executed by a processor, steps of the method in the first aspect are implemented, or steps of the method in the second aspect are implemented, or steps of the method in the third aspect are implemented.

A fifteenth aspect provides a chip. The chip includes a processor and a communication interface. The communication interface is coupled to the processor. The processor is configured to run a program or an instruction to implement the method in the first aspect, or implement the method in the second aspect, or implement the method in the third aspect.

A sixteenth aspect provides a computer program/program product. The computer program/program product is stored in a non-transitory storage medium. The computer program/program product is executed by at least one processor to implement the steps of the method in the first aspect, or the steps of method in the second aspect, or steps of the method in the third aspect.

DESCRIPTION OF THE INVENTION

Technical solutions in embodiments of this application are clearly described in the following with reference to accompanying drawings in embodiments of this application. Apparently, the described embodiments are merely some rather than all of embodiments of this application. All other embodiments obtained by a person skilled in the art based on embodiments of this application fall within the protection scope of this application.

In the specification and claims of this application, terms such as "first" and "second" are used to distinguish similar objects, but are not used to describe a sequence or order. It should be understood that terms used in this way are exchangeable in a proper case, so that embodiments of this application can be implemented in an order different from the order shown or described herein. In addition, objects distinguished by using "first" and "second" are usually of the same type, and the terms do not limit a quantity of the objects. For example, a first object can be one object or more objects. In addition, "and/or" used in this specification and the claims represents at least one of connected objects. The character "/" usually indicates an "or" relationship between associated objects.

It should be noted that technologies described in embodiments of this application are not limited to a long term evolution (LTE) system/an LTE-Advanced (LTE-A) system, and may also be applied to other wireless communication systems such as code division multiple access (CDMA), time division multiple access (TDMA), frequency division multiple access (FDMA), orthogonal frequency division multiple access (OFDMA), and single-carrier frequency division multiple access (SC-FDMA). Terms "system" and "network" in embodiments of this application are often used interchangeably. The described technologies can be applied to the systems and radio technologies mentioned above, and can also be applied to other systems and radio technologies. The following describes a new radio (NR) system for example purposes, and NR terms are used in most of the following descriptions. However, these technologies may also be applied to communication systems other than the NR system, for example, a 6th generation (6G) communication system.

Figure 1:
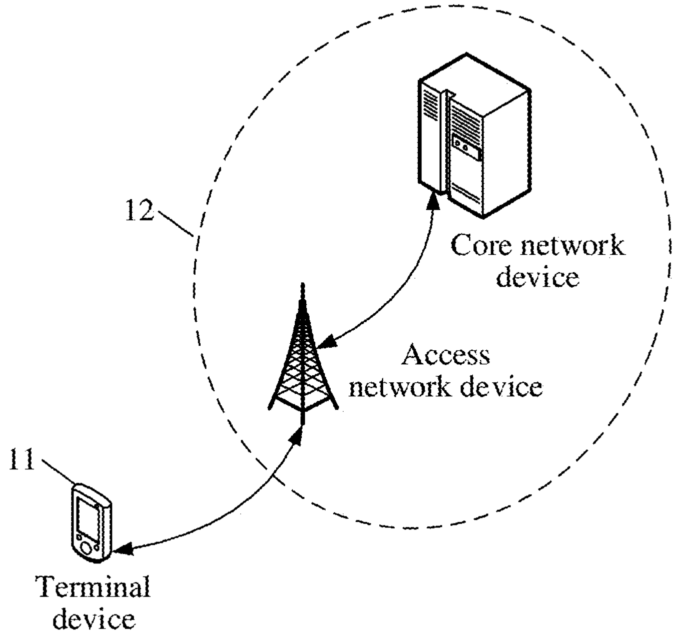
FIG. 1 is a first schematic diagram of a wireless communication system to which an embodiment of this application may be applied.

FIG. 1 is one of schematic diagrams of a wireless communication system to which an embodiment of this application may be applied. The wireless communication system shown in FIG. 1 includes a terminal device 11 and a network-side device 12. The terminal 11 may be a terminal-side device like a mobile phone, a tablet personal computer, a laptop computer, which is also referred to as notebook computer, a personal digital assistant (PDA), a palmtop computer, a netbook, an ultra-mobile personal computer (UMPC), a mobile internet device (MID), an augmented reality (AR)/virtual reality (VR) device, a robot, a wearable device, vehicular user equipment (VUE), pedestrian user equipment (PUE), a smart home (a home device with a wireless communication function, for example, a refrigerator, a television, a washing machine, or furniture), a games console, a personal computer (PC), a teller machine, and a self-service machine. The wearable device includes: a smart watch, a smart band, a smart headphone, smart glasses, a smart jewelry (a smart bangle, a smart bracelet, a smart ring, a smart necklace, a smart anklet, and the like), a smart wristband, a smart clothes, and the like. It should be noted that a type of the terminal device 11 is not limited in this embodiment of this application. The network-side device 12 may include an access network device or a core network device. The access network device 12 may also be referred to as a radio access network device, a radio access network (RAN), a radio access network function, or a radio access network unit. The access network device 12 may include a base station, a WLAN access point, a Wi-Fi node, or the like. The base station may be referred to as a NodeB, an evolved NodeB (eNB), an access point, a base transceiver station (BTS), a radio base station, a radio transceiver, a basic service set (BSS), an extended service set (ESS), a home NodeB, a home evolved NodeB, a transmitting receiving point (TRP), or another proper term in the art. The base station is not limited to a particular technical vocabulary as long as the same technical effect is achieved. Only a base station in the NR system is used as an example in embodiments of this application, but a type of the base station is not limited. The core network device may include, but is not limited to, at least one of the following: a core network node, a core network function, a mobility management entity (MME), an access and mobility management function (AMF), a session management function (SMF), a user plane function (UPF), a policy control function (PCF), a policy and charging rules function (PCRF), an edge application server discovery function (EASDF), a unified data management (UDM), a unified data repository (UDR), a home subscriber server (HSS), a centralized network configuration (CNC), a network repository function (NRF), a network exposure function (NEF), a local NEF (L-NEF), a binding support function (BSF), an application function (AF), or the like. It should be noted that in embodiments of this application, only a core network device in the NR system is used as an example for description, and a type of the core network device is not limited.

Figure 2:
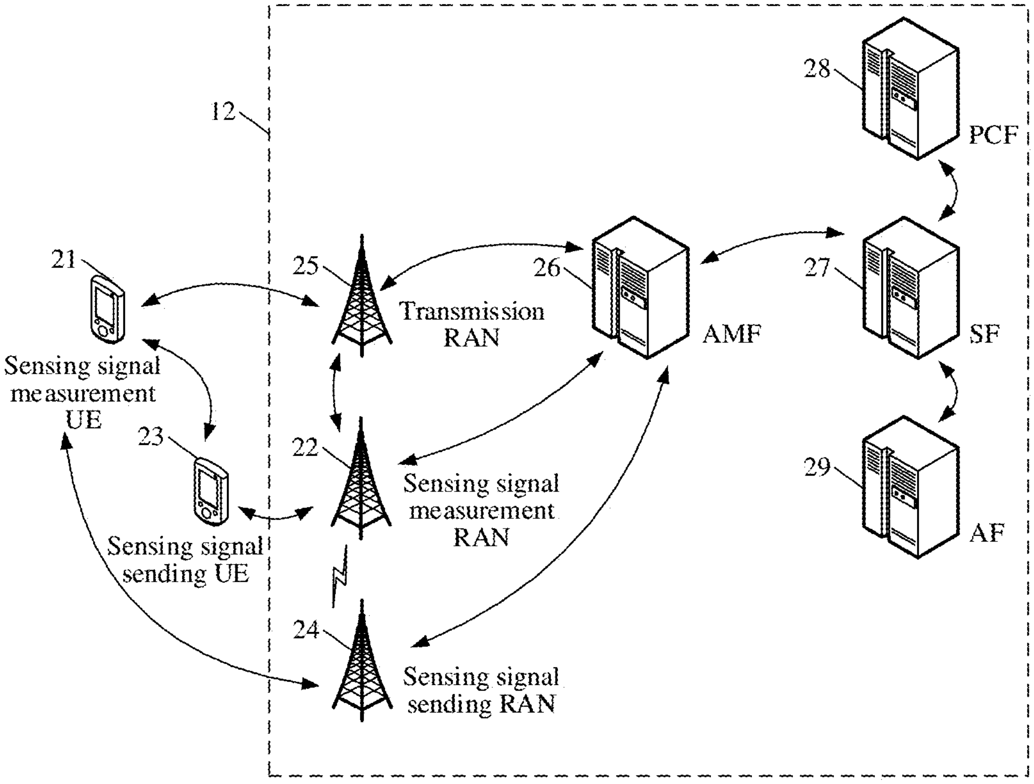
FIG. 2 is a second schematic diagram of a wireless communication system to which an embodiment of this application may be applied.

FIG. 2 is a second schematic diagram of a wireless communication system to which an embodiment of this application may be applied. The wireless communication system shown in FIG. 2 includes: A sensing signal measurement device (sensing signal measurement terminal device (UE) 21 or a sensing signal measurement RAN 22), a sensing signal sending device (sensing signal sending UE 23 or a sensing signal sending RAN 24), a transmission RAN 25, an AMF 26, a sensing function (SF) 27, a PCF 28, and an AF 29.

The SF is used to support a sensing service. The SF and the sensing device (including the sensing signal sending device and the sensing signal measurement device) can directly or indirectly exchange sensing service signaling and sensing measurement data. The SF performs corresponding data processing or further analysis based on obtained sensing measurement data to provide a sensing service analysis result to a consumer device of the sensing service. The consumer device may include: a terminal device, a third-party service function AF, a network-side device, a network management device, or the like.

The sensing signal measurement UE 21 may be a terminal device having a function of measuring a sensing signal. The terminal device may include but is not limited to the types of the terminal device 11 listed above, and the sensing signal measurement UE 21 may alternatively be a sensing radar or the like. The sensing signal measurement RAN 22 may be a RAN having a function of measuring a sensing signal.

The sensing signal sending UE 23 may be a terminal device having a function of transmitting a sensing signal. The terminal device may include but is not limited to the types of the terminal device 11 listed above, and the sensing signal measurement UE 21 may alternatively be a sensing signal transmitter or the like. The sensing signal sending RAN 24 may be a RAN having a function of transmitting a sensing signal.

Usually, a network may separately establish a plurality of channels for transmitting sensing measurement data for different sensing services. For example, a plurality of sensing signal measurement devices respectively measure a plurality of sensing signal sending devices for different sensing services, and establish a plurality of channels for transmitting related measurement data of a plurality of signals. In addition, for different sensing services, a same sensing signal measurement device may perform different types of measurement on signals sent from sensing signal sending devices, and establish a plurality of channels for transmitting a plurality of pieces of service-related measurement data. This causes a problem of redundant establishment of measurement data transmission channels for different sensing services. In this case, network resources are wasted.

A method for establishing a sensing service sharing channel provided by an embodiment of this application is described in detail by using some embodiments and application scenarios thereof with reference to accompanying drawings.

The method for establishing a sensing service sharing channel provided in this embodiment of this application can be applied to a scenario of sensing measurement data transmission. A first RAN establishes a sensing service sharing channel at a device granularity according to indication of an SF. The sensing service sharing channel is not only corresponding to a specific sensing service, but can be used to transmit sensing measurement data of a plurality of sensing services between the SF and the first RAN. In other words, the first RAN can transmit the sensing measurement data of the plurality of sensing services to the SF through the sensing service sharing channel. In this way, a problem of redundant establishment of measurement data transmission channels for different sensing services in current technologies is resolved. In this way, network resources are saved and network resource utilization is improved.

Figure 3:
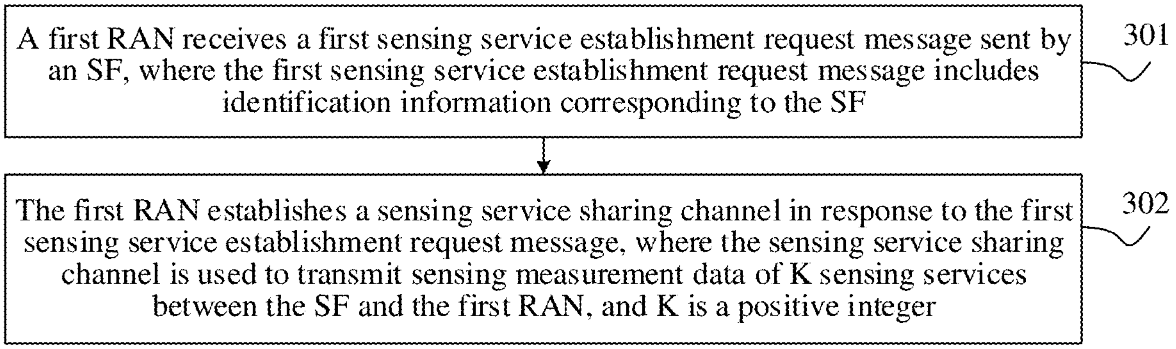
FIG. 3 is a first schematic flowchart of a method for establishing a sensing service sharing channel according to an embodiment of this application.

FIG. 3 is a first schematic flowchart of a method for establishing a sensing service sharing channel according to an embodiment of this application. As shown in FIG. 3, the method includes step 301 and step 302.

Step 301: A first RAN receives a first sensing service establishment request message sent by an SF. The first sensing service establishment request message includes identification information corresponding to the SF.

Step 302: The first RAN establishes a sensing service sharing channel in response to the first sensing service establishment request message. The sensing service sharing channel is used to transmit sensing measurement data of K sensing services between the SF and the first RAN, where K is a positive integer.

It should be noted that this embodiment of this application can be applied to a scenario of sensing measurement data transmission. For a connection relationship between the first RAN and the SF, reference may be made to that shown in FIG. 2. The SF sends the first sensing service establishment request message to the first RAN, where the first sensing service establishment request message is used to indicate the first RAN to establish the sensing service sharing channel between the SF and the first RAN. After the first RAN receives the first sensing service establishment request message sent by the SF, the first RAN establishes the sensing service sharing channel.

In actual implementation, the identification information corresponding to the SF may be used to distinguish or identify the sensing service sharing channel. The identification information corresponding to the SF is used to identify an endpoint of the SF in the sensing service sharing channel between the first RAN and the SF. The identification information corresponding to the SF may enable the first RAN to learn of an uplink destination SF reported by the sensing measurement data. For example, the identification information corresponding to the SF may include tunnel endpoint identification information (TEID) of the SF and/or IP address information of the SF.

It should be noted that, in this embodiment of this application, the sensing service sharing channel between the SF and the first RAN is at a device granularity, the sensing service sharing channel does not only correspond to a specific sensing service, and the first RAN does not need to separately establish measurement data transmission channels for different sensing services. The sensing service sharing channel can be used to transmit sensing measurement data of any sensing service between the SF and the first RAN. The first RAN can send sensing measurement data reported by a sensing measurement device received by the first RAN to the SF through the sensing service sharing channel.

Optionally, in addition to the identification information corresponding to the SF, the first sensing service establishment request message may include a sensing session identification (SSID) information list. The SSID list includes L SSIDs. One SSID corresponds to one sensing service, where L is a positive integer. The SF establishes a sensing session for each sensing service, and different SSIDs are used to identify different sensing sessions. The SSID list includes L SSIDs designated by the SF for indicating, to the first RAN, a plurality of SSIDs served by the sensing service sharing channel. The first RAN can perform exclusive data transmission according to the SSID list. In other words, the first RAN uses the sensing service sharing channel to support transmission of sensing measurement data of the sensing services corresponding to the plurality of SSIDs in the SSID list to the SF, but does not support transmission of sensing measurement data corresponding to an SSID not in the SSID list through the sensing service sharing channel. The first RAN may discard sensing measurement data corresponding to an SSID that is not in the SSID list when receiving the sensing measurement data.

According to the method for establishing a sensing service sharing channel provided by this embodiment of this application, the first RAN establishes the sensing service sharing channel at a device granularity according to indication of the SF. The sensing service sharing channel is not only corresponding to a specific sensing service, but can be used to transmit sensing measurement data of a plurality of sensing services between the SF and the first RAN. In other words, the first RAN can transmit the sensing measurement data of the plurality of sensing services to the SF through the sensing service sharing channel. In this way, a problem of redundant establishment of measurement data transmission channels for different sensing services in current technologies is resolved. In this way, network resources are saved and network resource utilization is improved.

Optionally, the first RAN responds to the first sensing service establishment request message, and after establishing the sensing service sharing channel, the first RAN sends a first sensing service establishment response message to the SF. The first sensing service establishment response message is used to indicate whether the sensing service sharing channel is successfully established. The SF receives the first sensing service establishment response message sent by the first RAN.

Optionally, the first sensing service establishment response message includes at least one of the following:

(1) identification information corresponding to the first RAN;

(2) first indication information, used to indicate whether the sensing service sharing channel is successfully established; or (3) second indication information, used to indicate whether a sensing service is accepted or successfully executed by a sensing device serving the sensing service.

In actual implementation, the identification information corresponding to the first RAN may be used to distinguish or identify the sensing service sharing channel. The identification information corresponding to the first RAN is used to identify an endpoint of the first RAN in the sensing service sharing channel between the first RAN and the SF. The SF can learn the first RAN that reports the sensing measurement data based on the identification information corresponding to the first RAN carried in the first sensing service establishment response message. For example, identification information corresponding to the first RAN includes tunnel endpoint identification information of the first RAN and/or IP address information of the first RAN.

In actual implementation, the second indication information may be used to indicate a sensing service accepted or successfully executed by a sensing device serving the sensing service, and/or indicate a sensing service rejected or failed to be executed by a sensing device serving the sensing service. The second indication information is obtained by the first RAN from the sensing signal measurement device and/or the sensing signal sending device.

In this embodiment of this application, after receiving the sensing service request message sent by the consumer device, based on the sensing service request message, the SF determines a sensing device serving the sensing service and determines the first RAN used to transmit the sensing measurement data of the sensing service. The sensing device includes at least one of the following: (1) M sensing signal measurement devices; or (2) N sensing signal sending devices; Both M and N are natural numbers. Then, the SF sends identification information of the M sensing signal measurement devices to the first RAN. Correspondingly, the first RAN receives the identification information that is of the M sensing signal measurement devices and that is transmitted by the SF.

After establishing the sensing service sharing channel in response to the first sensing service establishment request message, the first RAN triggers each sensing signal measurement device to establish a corresponding sensing measurement data transmission channel. A process of establishing the sensing measurement data transmission channel may include the following steps.

(1) The first RAN separately sends a second sensing service establishment request message to each of the M sensing signal measurement devices. The second sensing service establishment request message is used to indicate each sensing signal measurement device to establish a sensing measurement data transmission channel with the first RAN separately.

(2) For any one of the M sensing signal measurement devices, a sensing signal measurement device A is used as an example. The sensing signal measurement device A establishes a sensing measurement data transmission channel after receiving the second sensing service establishment request message sent by the first RAN. The sensing signal measurement device A sends a second sensing service establishment response message to the first RAN. The second sensing service establishment response message is used to indicate whether a sensing measurement data transmission channel is successfully established.

(3) The first RAN receives a second sensing service establishment response message sent by each sensing signal measurement device.

In actual implementation, in a case that the M sensing signal measurement devices include sensing signal measurement UE, a sensing measurement data transmission channel established by the sensing signal measurement UE is a data radio bearer (DRB) corresponding to the sensing signal measurement UE.

Alternatively, in a case that the M sensing signal measurement devices include a second RAN, a sensing measurement data transmission channel established by the second RAN is an interface channel (like an Xn interface channel) between the second RAN and the first RAN.

For example, if the sensing signal measurement device is sensing UE, the first RAN triggers each sensing UE to establish an air interface data transmission channel (like a DRB), so that the sensing UE can subsequently send sensing measurement data to the first RAN through the data transmission channel.

If the sensing signal measurement device is sensing RAN, the first RAN triggers each sensing RAN to establish a data transmission channel (like an Xn interface channel) between the sensing RAN and the first RAN, so that the sensing RAN can subsequently send sensing measurement data to the first RAN through the data transmission channel.

In this embodiment of this application, the sensing signal measurement device receives a sensing service control message sent by the SF. The sensing service control message includes the SSID corresponding to the sensing service. The sensing signal measurement device measures the sensing signal based on the sensing service control message to obtain the sensing measurement data of the sensing service. Then, the sensing signal measurement device sends, to the transmission RAN through the sensing measurement data transmission channel, the sensing measurement data of the sensing service and the SSID of the sensing session corresponding to the sensing service.

After receiving sensing measurement data of T sensing services sent by P sensing signal measurement devices, the first RAN sends the sensing measurement data of T sensing services to the SF through the sensing service sharing channel. P and T are positive integers. P is less than or equal to M. T is less than or equal to K.

Optionally, the first RAN can simultaneously report SSIDs corresponding to all pieces of sensing measurement data in the process of reporting the sensing measurement data to the SF, and the SSIDs corresponding to all the pieces of sensing measurement data are used to identify sensing services respectively corresponding to all the pieces of sensing measurement data. For example, the SSID corresponding to the sensing measurement data may be sent to the RAN along with the sensing measurement data as a part of a packet head information. The first RAN determines the SSID corresponding to each piece of sensing measurement data. The first RAN sends the SSID corresponding to each piece of sensing measurement data to the SF through the sensing service sharing channel.

An implementation for the first RAN to determine the SSID corresponding to each piece of the sensing measurement data includes any one of the following.

(1) When sending the sensing measurement data to the first RAN, the sensing signal measurement device simultaneously sends the SSID corresponding to the sensing measurement data. The first RAN receives the SSID corresponding to each piece of sensing measurement data sent by each of the P sensing signal measurement devices. The first RAN determines the SSID corresponding to each piece of sensing measurement data.

(2) A mapping relationship between a sensing signal measurement device ID/data transmission channel identification and a sensing session is stored in the first RAN. When the first RAN receives the sensing measurement data that is of the T sensing services and that is sent by P sensing signal measurement devices, the SSID corresponding to each piece of sensing measurement data is determined based on the mapping relationship.

In actual implementation, in a wireless communication system including more than two SFs, if the first RAN establishes different sensing service sharing channels with different SFs, after receiving the sensing measurement data that is of the T sensing services and that is sent by the P sensing signal measurement devices, the first RAN needs to determine a sensing service sharing channel for transmitting each piece of sensing measurement data. In this embodiment of this application, the first RAN determines the SF serving the sensing service based on the identification information corresponding to the SF, and sends the sensing measurement data to the SF. Based on the SSID corresponding to each piece of sensing measurement data, the first RAN determines identification information corresponding to an SF that corresponds to the SSID corresponding to each piece of sensing measurement data. The first RAN determines the SF serving the sensing service and the sensing service sharing channel based on the identification information corresponding to the SF, and sends the sensing measurement data to the SF.

Optionally, if the SF decides to modify the sensing service sharing channel (for example, the SF decides to update the SSID list corresponding to the sensing service sharing channel after receiving a trigger message from the consumer device for adding a sensing service or reducing an original sensing service), the SF may postpone establishment of a path the same as the sensing service sharing channel and request the first RAN to modify the established sensing service sharing channel, so as to serve one or more updated sensing services.

For example, the SF sends a sensing service modification request message to the first RAN. The sensing service modification request includes the identification information corresponding to the SF and/or the identification information corresponding to the first RAN. The sensing service modification request message is used to indicate the first RAN to modify the sensing service sharing channel between the SF and the first RAN. The first RAN modifies the sensing service sharing channel after receiving the sensing service modification request message sent by the SF. The first RAN sends a sensing service modification response message to the SF, where the sensing service modification response message is used to indicate whether the sensing service sharing channel is modified successfully. The SF receives the sensing service modification response message sent by the first RAN.

Optionally, when the SF decides to end the sensing service (which may be triggered by a consumer AF, or triggered by expiration of a set sensing service timer), the SF initiates release of the sensing service sharing channel established for the sensing service.

For example, the SF sends a sensing service deletion request message to the first RAN. The sensing service deletion request message includes the identification information corresponding to the SF and/or the identification information corresponding to the first RAN. The sensing service deletion request message is used to indicate the first RAN to delete the sensing service sharing channel between the SF and the first RAN. The first RAN deletes the sensing service sharing channel after receiving the sensing service deletion request message sent by the SF. The first RAN sends a sensing service deletion response message to the SF. The sensing service deletion response message is used to indicate whether the sensing service sharing channel is deleted successfully. The SF receives the sensing service deletion response message sent by the first RAN.

Figure 4:
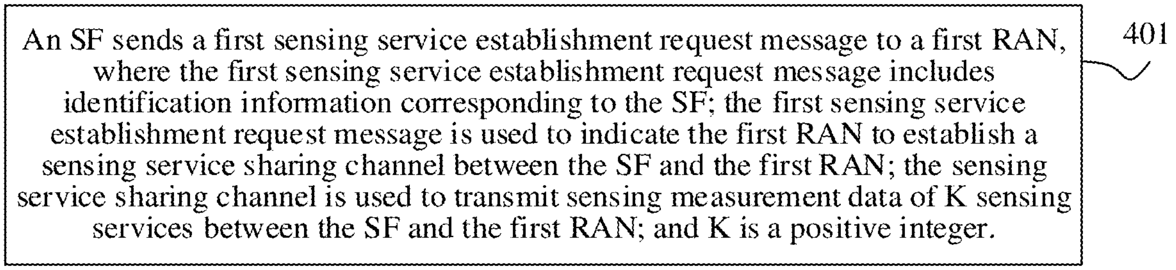
FIG. 4 is a second schematic flowchart of a method for establishing a sensing service sharing channel according to an embodiment of this application.

FIG. 4 is a second schematic flowchart of a method for establishing a sensing service sharing channel according to an embodiment of this application. As shown in FIG. 4, the method includes the following steps.

Step 401: An SF sends a first sensing service establishment request message to the first RAN. The first sensing service establishment request message includes identification information corresponding to the SF. The first sensing service establishment request message is used to indicate the first RAN to establish a sensing service sharing channel between the SF and the first RAN. The sensing service sharing channel is used to transmit sensing measurement data of K sensing services between the SF and the first RAN. K is a positive integer.

It should be noted that, this embodiment of this application can be applied to a scenario of sensing measurement data transmission. For a connection relationship between the first RAN and the SF, reference may be made to that shown in FIG. 2. The SF sends the first sensing service establishment request message to the first RAN, where the first sensing service establishment request message is used to indicate the first RAN to establish the sensing service sharing channel between the SF and the first RAN. After the first RAN receives the first sensing service establishment request message sent by the SF, the first RAN establishes the sensing service sharing channel.

In actual implementation, the identification information corresponding to the SF may be used to distinguish or identify the sensing service sharing channel. The identification information corresponding to the SF is used to identify an endpoint of the SF in the sensing service sharing channel between the first RAN and the SF. The identification information corresponding to the SF may enable the first RAN to learn of an uplink destination SF reported by the sensing measurement data. For example, the identification information corresponding to the SF may include tunnel endpoint identification information (TEID) of the SF and/or IP address information of the SF.

Optionally, for descriptions and explanations of establishing the sensing service sharing channel by the first RAN, refer to the descriptions of the embodiment shown in FIG. 3. Details are not described herein to avoid repetition.

According to the method for establishing a sensing service sharing channel provided by this embodiment of this application, the SF indicates the first RAN to establish a sensing service sharing channel at a device granularity. The sensing service sharing channel is not only corresponding to a specific sensing service, but can be used to transmit sensing measurement data of a plurality of sensing services between the SF and the first RAN. In other words, the first RAN can transmit the sensing measurement data of the plurality of sensing services to the SF through the sensing service sharing channel. In this way, a problem of redundant establishment of measurement data transmission channels for different sensing services in current technologies is resolved. In this way, network resources are saved and network resource utilization is improved.

Optionally, After the SF sends the first sensing service establishment request message to the first RAN, the SF receives a first sensing service establishment response message sent by the first RAN. The first sensing service establishment response message is used to indicate whether the sensing service sharing channel is successfully established. In actual implementation, the first sensing service establishment response message includes at least one of the following:

(1) identification information corresponding to the first RAN, where for example, the identification information corresponding to the first RAN includes tunnel endpoint identification information of the first RAN and/or IP address information of the first RAN;

(2) first indication information, used to indicate whether the sensing service sharing channel is successfully established; or (3) second indication information, used to indicate whether a sensing service is accepted or successfully executed by a sensing device serving the sensing service.

Optionally, a trigger condition for the SF to send the first sensing service establishment request message to the first RAN may be: The SF receives a sensing service request message sent by a consumer device. In other words, the SF receives the sensing service request message sent by the consumer device. The sensing service request message includes information of a sensing object of the sensing service. The SF transmits a first sensing service establishment request message to the first RAN in response to the sensing service request message.

In actual implementation, in addition to the information of the sensing object of the sensing service, the sensing service request message may further include sensing service description information, where the sensing service description information indicates a service feature of a sensing service. The sensing service description information includes at least one of the following:

(1) Sensing service type information

Optionally, the sensing service type information is related to sensing physical scope and a real-time requirement. For example, the sensing service type information includes: Type I, Type II, Type III, and Type IV. Type I has a large sensing range and a high real-time requirement (Delay Critical LSS). Type II has a large sensing range and a low real-time requirement (LSS). Type III has a small sensing range and a low real-time requirement (Delay Critical SSS). Type IV has a small sensing range and a low real-time requirements (SSS).

(2) Sensing quantity information. The sensing quantity information includes at least one of the following: a position of the sensing object, a distance of the sensing object, a moving speed of the sensing object, imaging of the sensing object, a moving track of the sensing object, texture analysis information of the sensing object, or the material analysis information of the sensing object.

(3) Sensing service purpose or application purpose information (4) Sensing service granularity information Optionally, the sensing service granularity information may include a single-UE granularity, a user-group granularity, or an area granularity.

(5) Sensing service time information indicating time information of sensing service execution (6) Sensing measurement data report information indicating a report condition, a report time, a report format, a report count, and the like of the sensing measurement data (7) Sensing service quality of service (QOS) information, that is, sensing indicator Optionally, the sensing service QoS information may include at least one of sensing precision, a sensing error, a sensing range, a sensing delay, a detection probability, or a false alarm probability. The sensing precision includes a range resolution, an imaging resolution, a moving speed resolution, or an angle resolution. The sensing error includes a distance error, an imaging error, or a moving speed error.

(8) Information of a service range of a sensing service, indicating a service range in which the sensing service is performed for a sensing object, where the service range may be a relative location range (for example, within 20 meters from the sensing object) or an absolute location range. The absolute location range is, for example, one or more tracking area indicators (TAIs), one or more cell IDs (cell IDs), or a specific geographic area identifier (for example, a target square).

It should be understood that the sensing object may include an area granularity or a user granularity. In other words, the sensing object may be an object area or an object user.

In this embodiment of this application, after the SF receives the sensing service request message sent by the consumer device, the SF determines, based on the sensing service request message, the sensing device serving the sensing service. The sensing device may include only M sensing signal measurement devices, and/or the sensing device may include N sensing signal sending devices. Both M and N are natural numbers.

Optionally, based on the sensing service request message, the SF determines the first RAN used to transmit the sensing measurement data of the sensing service. Optionally, a manner in which the SF determines the first RAN used to transmit the sensing measurement data of the sensing service may include any of the following.

(1) The SF determines, based on the sensing object of the sensing service, the first RAN used to transmit the sensing measurement data of the sensing service, and the first RAN is capable of serving the sensing object.

For example, based on an object area or a target service area, for example, an area of interest (AOI), of a sensing service required by a consumer device (like an AF), the SF selects a first RAN that serves the target service area and that is used to transmit sensing measurement data. The SF may learn information of the RAN serving the target service area from a network management device or an AMF.

For another example, the SF determines, based on the sensing object (that is, the service object) that is of the sensing service and that is provided by the consumer device, a network location area where the sensing object is located, and then determines, based on the network location area, a first RAN that serves the network location area and that is used to transmit sensing measurement data. The SF may learn information of the RAN serving the network location area from a network management device or an AMF.

(2) The SF determines, based on the sensing device of the sensing service, the first RAN used to transmit the sensing measurement data of the sensing service, and the first RAN is capable of serving the sensing device.

For example, the SF determines, based on a determined sensing device that serves the sensing service, an RAN used to transmit the sensing measurement data. The data transmission RAN is responsible for data transmission between the sensing devices. The SF may learn information of the data transmission RAN corresponding to the sensing device from a network management device or an AMF.

In this embodiment of this application, after the SF receives the sensing service request message sent by the consumer device, the SF establishes a sensing session in a one-to-one correspondence to each sensing service based on a different sensing service request message sent by each consumer device. Different sensing services correspond to different sensing sessions. Each sensing service corresponds to one sensing session. Optionally, the SF establishes a corresponding sensing session with the sensing service based on the sensing service request message, and determines an SSID of the sensing session. The SF allocates a corresponding SSID to each sensing service. Different SSIDs are used to identify different sensing sessions. Based on the SSID, the SF performs operations such as data obtaining, analysis, and processing, sensing service modification, and sensing service deletion.

Optionally, in the first sensing service establishment request message sent to the first RAN, the SF may include an SSID list in addition to the identification information corresponding to the SF. The SSID list includes the determined SSID of the sensing session. The SSID list includes L SSIDs. One SSID corresponds to one sensing service. L is a positive integer.

In this embodiment of this application, after the SF receives the sensing service request message sent by the consumer device, the SF obtains, based on the sensing service request message, QoS policy information for the sensing service. The QoS policy information for the sensing service indicates a sensing execution policy and a resource that is related to the sensing service and that is allocated by a wireless communication network for the sensing service. An implementation of obtaining, by the SF, the QoS policy information for the sensing service based on the sensing service request message may include the following modes.

Mode 1: The SF sends a policy request message to a PCF. The policy request message is used to request to obtain the QoS policy information for the sensing service. The policy request message includes at least one of the following: part or all of sensing service description information, information of a sensing object (like an object area or an object user) of the sensing service, identification information of the sensing device, or the like.

Mode 2: The SF generates QoS policy information suitable for the sensing service.

In this embodiment of this application, after the SF determines the SSID of the sensing session and/or the QoS policy information for the sensing service, the SF sends a sensing service control message to the sensing signal measurement device. Optionally, the SF sends sensing service control message to the M sensing signal measurement devices separately. The sensing service control message includes the SSID of the sensing session used to identify the sensing session corresponding to the sensing service. Obtaining, analysis, and processing of sensing measurement data, sensing service modification, sensing service deletion, and the like are performed between the SF and the sensing signal measurement devices based on the SSID.

Optionally, in addition to the SSID of the sensing session, the sensing service control message may include at least one of the following:

(1) part or all of the QoS policy information for the sensing service; or (2) part or all of the sensing service description information.

By using the sensing service control message to carry the QoS policy information for the sensing service, the SF may indicate the sensing signal measurement device to measure a sensing signal based on the QoS policy information for the sensing service. For example, sensing UE or a sensing RAN implements, based on predetermined sensing precision, a corresponding measurement task for QoS parameters (such as a sensing distance, angle, or intensity) indicated in the QoS policy information for the sensing service, to obtain the sensing measurement data.

It should be understood that the SF may send the sensing service control message to the sensing signal measurement device through the first RAN. That is, the SF sends the sensing service control message to the first RAN. After the first RAN obtains information needed by the first RAN (for example, identification information of the M sensing signal measurement devices), the first RAN forwards the sensing service control message to the sensing signal measurement devices. Optionally, the SF sends the identification information of the M sensing signal measurement devices to the first RAN.

In this embodiment of this application, after the SF receives the sensing service request message sent by the consumer device, the SF separately sends a sensing resource configuration message to each of the N sensing signal sending devices. The sensing resource configuration message includes the SSID of the sensing session corresponding to the sensing service, and the SSID is used for the sensing signal sending device to associate with the sensing session.

The sensing resource configuration message is used to configure a corresponding resource for the sensing signal sending device, so that the sensing signal sending device sends the sensing signal according to indication of the sensing resource configuration information. Optionally, the sensing resource configuration message includes at least one of the following: a spectrum, a modulation mode, or a synchronization period. For example, the sensing signal sending device sends the sensing signal with a spectrum indicated in the sensing resource configuration message. Optionally, the sensing resource configuration message further includes part or all of the sensing service description information.

In this embodiment of this application, after receiving the sensing service control message sent by the SF, the sensing signal measurement device measures the sensing signal based on the sensing service control message, to obtain the sensing measurement data of the sensing service. Then, the sensing signal measurement device sends, to the transmission RAN through the sensing measurement data transmission channel, the sensing measurement data of the sensing service and the SSID of the sensing session corresponding to the sensing service. After receiving sensing measurement data of T sensing services sent by P sensing signal measurement devices, the first RAN sends the sensing measurement data of the T sensing services to the SF through the sensing service sharing channel. P and T are positive integers. P is less than or equal to M. T is less than or equal to K. Optionally, the first RAN can simultaneously report SSIDs corresponding to all pieces of sensing measurement data in the process of reporting the sensing measurement data to the SF, and the SSIDs corresponding to all the pieces of sensing measurement data are used to identify sensing services respectively corresponding to all the pieces of sensing measurement data. For example, the SSID corresponding to the sensing measurement data may be sent to the RAN along with the sensing measurement data as a part of a packet head information. Optionally, the first RAN determines the SSID corresponding to each piece of sensing measurement data. The first RAN sends the SSID corresponding to each piece of sensing measurement data to the SF through the sensing service sharing channel.

After receiving the sensing measurement data of the T sensing services and the SSID corresponding to each piece of sensing measurement data, which are sent by the first RAN through the sensing service sharing channel, the SF performs classification and association on all the pieces of sensing measurement data based on the SSID corresponding to each piece of sensing measurement data, so that pieces of the measurement data identified by a same SSID are classified into a same category to obtain the sensing measurement data of the T sensing services, so as to perform corresponding processing on each category of data or forward the data to a consumer device corresponding to a sensing service.

Optionally, the SF obtains a sensing service analysis result of each of the T sensing services based on the sensing measurement data of the T sensing services. For example, the SF may perform corresponding calculation and analysis according to an algorithm that is for a sensing service type corresponding to an SSID and that is configured in the SF, to obtain a sensing service analysis result. For example, the sensing service analysis result may be information about a respiration health status of a user (whether it is abnormal, an abnormal degree, and the like) or information about danger in surrounding traffic (whether a pedestrian suddenly appears, an occurrence probability, a time, and the like). It should be understood that the foregoing algorithm for a sensing service type corresponding to an SSID may be an AI-based intelligent algorithm that may come from an external intelligent entity or from AI model training.

Optionally, the SF correspondingly sends the sensing measurement data and/or the sensing service analysis result of each of the T sensing services to the consumer device corresponding to each of the sensing services.

It should be understood that the SF can directly send the sensing measurement data of each of the T sensing services to the consumer device corresponding to each of the sensing services.

Figure 5:
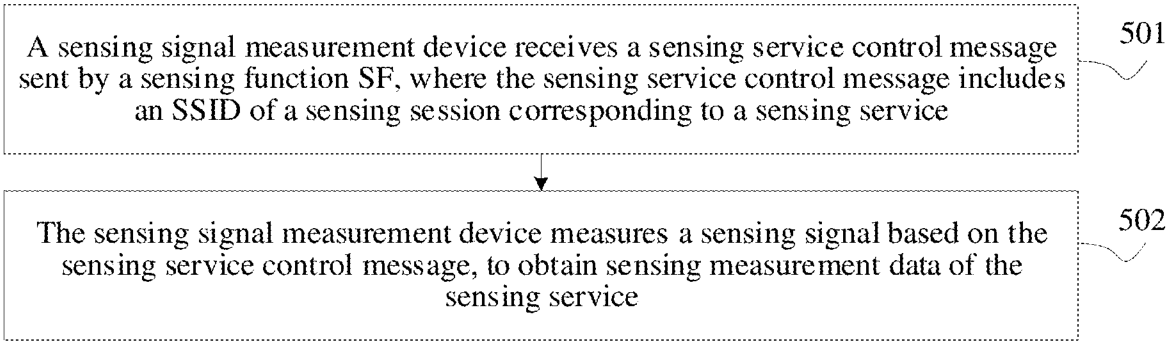
FIG. 5 is a third schematic flowchart of a method for establishing a sensing service sharing channel according to an embodiment of this application.

FIG. 5 is a third schematic flowchart of a method for establishing a sensing service sharing channel according to an embodiment of this application. As shown in FIG. 5, the method includes the following steps.

Step 501: A sensing signal measurement device receives a sensing service control message sent by a sensing function SF. The sensing service control message includes an SSID of a sensing session corresponding to a sensing service.

Step 502: The sensing signal measurement device measures a sensing signal based on the sensing service control message to obtain sensing measurement data of the sensing service.

Optionally, the sensing signal measurement device sends, to a first RAN through a sensing measurement data transmission channel, sensing measurement data of the sensing service and an SSID corresponding to the sensing measurement data.

After receiving sensing measurement data of T sensing services sent by P sensing signal measurement devices, the first RAN sends the sensing measurement data of the T sensing services to the SF through the sensing service sharing channel. P and T are positive integers. P is less than or equal to M. T is less than or equal to K.

According to the method for establishing a sensing service sharing channel provided in this embodiment of this application, the SF sends the sensing service control message to the sensing signal measurement device. The sensing service control message includes the SSID of the sensing session corresponding to the sensing service, to indicate the sensing signal measurement device to measure the sensing signal for the sensing service.

In actual implementation, after establishing the sensing service sharing channel in response to the first sensing service establishment request message, the first RAN triggers each sensing signal measurement device to establish a corresponding sensing measurement data transmission channel. Optionally, the first RAN sends a second sensing service establishment request message to each of M sensing signal measurement devices. The second sensing service establishment request message is used to indicate each sensing signal measurement device to establish a sensing measurement data transmission channel with the first RAN separately. After receiving the second sensing service establishment request message sent by the first radio access network RAN, the sensing signal measurement device establishes the sensing measurement data transmission channel in response to the second sensing service establishment request message. The sensing signal measurement device sends a second sensing service establishment response message to the first RAN.

Figure 6:
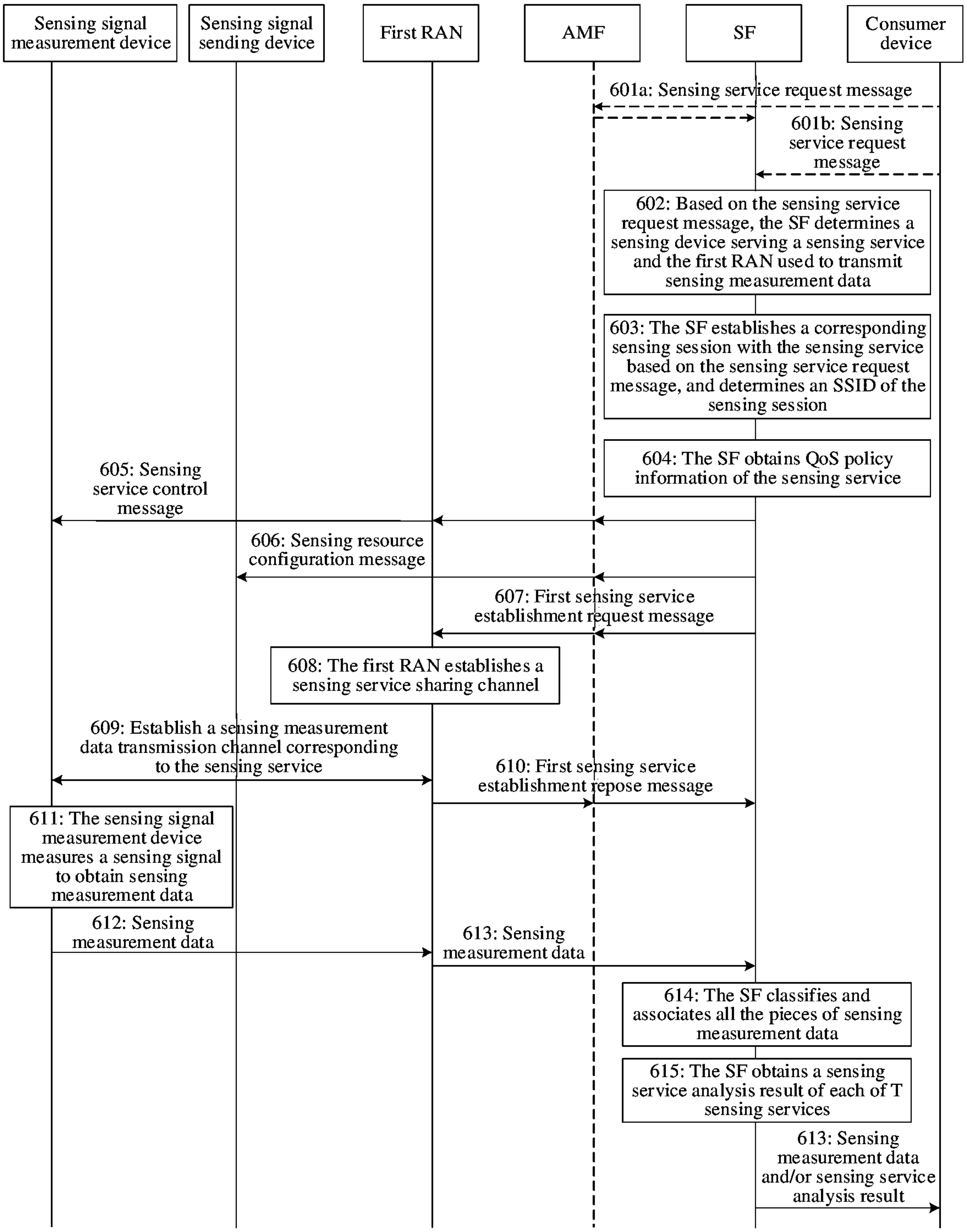
FIG. 6 is a schematic flowchart of a signaling procedure in a method for establishing a sensing service sharing channel according to an embodiment of this application.

FIG. 6 is a schematic flowchart of signaling in a method for establishing a sensing service sharing channel according to an embodiment of this application. As shown in FIG. 6, the method includes the following steps.

Step 601: A consumer device initiates a sensing service request message to an SF. The sensing service request message includes information of a sensing object of a sensing service. The sensing service request message is used to request the SF to provide the sensing service.

Optionally, a sending mode of the sensing service request message may include the following modes.

Mode 1: Refer to 601*b*. An AF sends the sensing service request message (an NEF is used or the NEF is not used) to the SF.

Mode 2: Refer to 601*a*. An AF first sends the sensing service request message (an NEF is used or the NEF is not used) to the AMF, and then the AMF forwards the sensing service request message to the corresponding SF.

In this embodiment of this application, a consumer device may include a terminal device, a third-party service function AF, a network-side device, a network management device, or the like.

Step 602: After receiving the sensing service request message sent by the consumer device, based on the sensing service request message, the SF determines a sensing device serving the sensing service and the first RAN used to transmit the sensing measurement data.

The sensing device includes M sensing signal measurement devices. Alternatively, the sensing device includes M sensing signal measurement devices and N sensing signal sending devices. Both M and N are natural numbers.

Step 603: The SF establishes a corresponding sensing session with the sensing service based on the sensing service request message, and determines an SSID of the sensing session.

Step 604: The SF obtains QoS policy information for the sensing service based on the sensing service request message.

It should be noted that, embodiments of this application do not limit an execution order of Step 603 and Step 604. Step 603 may be executed before Step 604, or Step 603 may be executed after Step 604, or Step 603 and Step 604 may be executed simultaneously.

Step 605: The SF sends a sensing service control message to the sensing signal measurement device.

Step 606: The SF sends a sensing resource configuration message to each of the N sensing signal sending devices. The sensing signal sending device sends the sensing signal. The sensing resource configuration message includes the SSID of the sensing session corresponding to the sensing service.

Step 607: The SF sends a first sensing service establishment request message to the first RAN. The first sensing service establishment request message is used to indicate the first RAN to establish a sensing service sharing channel between the SF and the first RAN. The sensing service sharing channel is used to transmit sensing measurement data of K sensing services between the SF and the first RAN. K is a positive integer.

It should be noted that, the messages in Step 605 and Step 607 may both be sent by the SF to the first RAN. After obtaining cell information needed by the first RAN, the first RAN forwards other information to a corresponding sensing signal measurement device. For example, the SF uses the same message to encapsulate different content in different containers. For example, the SF encapsulates content related to the sensing service control message in a first container, and then the content is forwarded to the sensing signal measurement device through the first RAN. Content related to the first sensing service establishment request message is encapsulated in a second container and sent to the first RAN.

In addition, the messages in Step 606 and Step 607 may both be sent by the SF to the first RAN. After obtaining cell information needed by the first RAN, the first RAN forwards other information to a corresponding sensing signal sending device. For example, the SF uses the same message to encapsulate different content in different containers. For example, the SF encapsulates content related to the sensing resource configuration message in a first container, and the content is forwarded to the sensing signal sending device through the first RAN. Content related to the first sensing service establishment request message is encapsulated in a second container and sent to the first RAN.

Optionally, K may represent a capacity of the sensing service sharing channel.

In addition to indicating the first RAN to establish the sensing service sharing channel and transmitting sensing measurement data of K sensing services on the sensing service sharing channel, the first sensing service establishment request message may also be used to modify the capacity of the sensing service sharing channel, in other words, the first sensing service establishment request message may also be a first sensing service modification request message.

Before the sensing service sharing channel is established, the SF sends the first sensing service establishment request message to the first RAN. The first sensing service establishing request message is used to indicate the first RAN to establish the sensing service sharing channel, and the capacity of the sensing service sharing channel is K.

After the sensing service sharing channel is established, when the SF sends the first sensing service establishment request message to the first RAN again, the first RAN does not need to establish a sensing service sharing channel again, but modifies the capacity of the sensing service sharing channel. For example, for the capacity, X sensing services are added or Y sensing services are reduced. In this case, the capacity of the sensing service sharing channel is modified from K to K+X or K−Y. That is, the sensing service sharing channel is used to transmit sensing measurement data of (K+X) or (K−Y) sensing services between the SF and the first RAN.

Optionally, the first sensing service establishment request message further includes an SSID list. The SSID list includes L SSIDs. One SSID corresponds to one sensing service. L is a positive integer.

Based on the foregoing embodiment, when the SF sends the first sensing service establishment request message to the first RAN before the sensing service sharing channel is established, and the first sensing service establishment request message includes the SSID list including the L SSIDs, the first RAN establishes the sensing service sharing channel, and the sensing service sharing channel supports L sensing services corresponding to the L SSIDs.

After the sensing service sharing channel is established, when the SF sends the first sensing service establishment request message to the first RAN again, and the first sensing service establishment request message includes D SSIDs, the first RAN does not need to establish a sensing service sharing channel again, but modifies the sensing services supported by the sensing service sharing channel, so that the sensing service sharing channel not only supports the L sensing services corresponding to the L SSIDs, but also supports the D sensing services corresponding to the D SSIDs.

Step 608: After the first RAN receives the first sensing service establishment request message sent by the SF, the first RAN establishes the sensing service sharing channel. The sensing service sharing channel is used to transmit sensing measurement data of K sensing services between the SF and the first RAN. K is a positive integer.

Step 609: The first RAN triggers each sensing signal measurement device to establish a sensing measurement data transmission channel corresponding to the sensing service.

Optionally, the first RAN sends a second sensing service establishment request message to each of M sensing signal measurement devices. After receiving the second sensing service establishment request message sent by the first radio access network RAN, the sensing signal measurement device establishes the sensing measurement data transmission channel. The sensing signal measurement device sends a second sensing service establishment response message to the first RAN.

Optionally, in a case that the SF sends the sensing service control message to the sensing signal measurement device through the first RAN, the first RAN may use the second sensing service establishment request message to carry the sensing service control message, so as to forward, to the sensing signal measurement device, the sensing service control message sent by the SF.

Step 610: The first RAN sends a first sensing service establishment response message to the SF. The first sensing service establishment response message is used to indicate whether the sensing service sharing channel is successfully established.

Step 611: The sensing signal measurement device measures a sensing signal based on the sensing service control message to obtain sensing measurement data of the sensing service.

Step 612: The sensing signal measurement device sends, to the first RAN through the sensing measurement data transmission channel, the sensing measurement data of the sensing service and an SSID corresponding to the sensing measurement data.

Step 613: After receiving the sensing measurement data of the T sensing services sent by the P sensing signal measurement devices, the first RAN sends the sensing measurement data of the T sensing services to the SF through the sensing service sharing channel.

Step 614: After receiving the sensing measurement data of the T sensing services and the SSID corresponding to each piece of sensing measurement data, which are sent by the first RAN through the sensing service sharing channel, the SF classifies and associates all the pieces of sensing measurement data based on the SSID corresponding to each piece of sensing measurement data.

Step 615: The SF obtains a sensing service analysis result of each of the T sensing services based on the sensing measurement data of the T sensing services.

Step 616: The SF correspondingly sends the sensing measurement data and/or the sensing service analysis result of each of the T sensing services to the consumer device corresponding to each of the sensing services.

In this embodiment of this application, the SF establishes a sharing channel at a device granularity between the SF and the first RAN in response to sensing service request messages of different consumer devices, to transmit all pieces of sensing measurement data related to sensing services. Regardless of a sensing service of sensing measurement data, one channel is used for report to the SF. In this way, network resources are saved.

According to the method for establishing a sensing service sharing channel provided by embodiments of this application, an execution body may be an apparatus for establishing a sensing service sharing channel. In embodiments of this application, an example in which the method for establishing a sensing service sharing channel is executed by an apparatus for establishing a sensing service sharing channel is used to explain the apparatus for establishing a sensing service sharing channel provided by an embodiment of this application.

Figure 7:
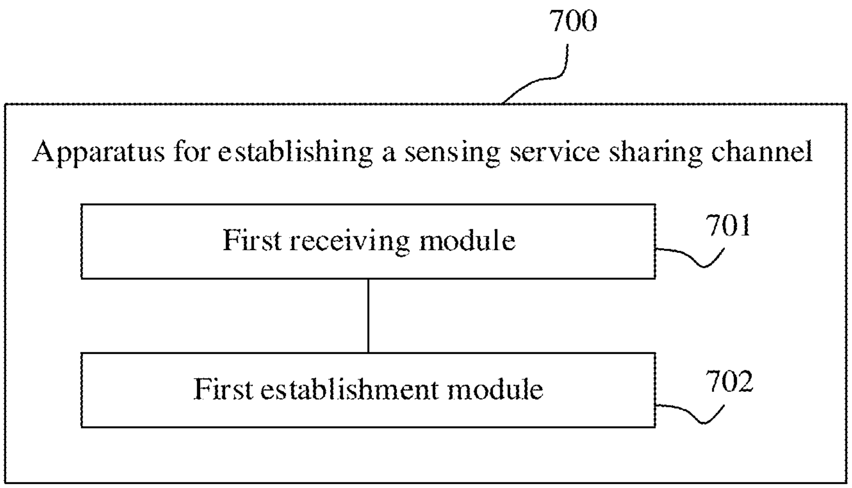
FIG. 7 is a first schematic diagram of a structure of an apparatus for establishing a sensing service sharing channel according to an embodiment of this application.

FIG. 7 is a first schematic diagram of a structure of an apparatus for establishing a sensing service sharing channel according to an embodiment of this application. As shown in FIG. 7, an apparatus 700 for establishing a sensing service sharing channel is applied to a first RAN and includes:

- a first receiving module 701, configured to receive a first sensing service establishment request message sent by an SF, where the first sensing service establishment request message includes identification information corresponding to the SF; and
- a first establishment module 702, configured to establish a sensing service sharing channel in response to the first sensing service establishing request message, where the sensing service sharing channel is used to transmit sensing measurement data of K sensing services between the SF and the first RAN, and K is a positive integer.

In the apparatus for establishing a sensing service sharing channel provided by this embodiment of this application, the sensing service sharing channel is established at a device granularity according to indication of the SF. The sensing service sharing channel is not only corresponding to a specific sensing service, but can be used to transmit sensing measurement data of a plurality of sensing services between the SF and the first RAN. In other words, the first RAN can transmit the sensing measurement data of the plurality of sensing services to the SF through the sensing service sharing channel. In this way, a problem of redundant establishment of measurement data transmission channels for different sensing services in current technologies is resolved. In this way, network resources are saved and network resource utilization is improved.

Optionally, the apparatus 700 for establishing a sensing service sharing channel further includes:

- a second sending module, configured to send a first sensing service establishment response message to the SF, where the first sensing service establishment response message is used to indicate whether the sensing service sharing channel is successfully established.

Optionally, the first sensing service establishment response message includes at least one of the following:

- identification information corresponding to the first RAN;
- first indication information, used to indicate whether the sensing service sharing channel is successfully established; or
- second indication information, used to indicate whether the sensing service is accepted or successfully executed by a sensing device serving the sensing service.

Optionally, the identification information corresponding to the first RAN includes tunnel endpoint identification information of the first RAN and/or IP address information of the first RAN.

Optionally, the identification information corresponding to the SF includes tunnel endpoint identification information of the SF and/or IP address information of the SF.

Optionally, the first sensing service establishment request message further includes a sensing session identification information SSID list.

The SSID list includes L SSIDs, and one SSID corresponds to one sensing service, and L is a positive integer.

Optionally, the apparatus 700 for establishing a sensing service sharing channel further includes:

- a third receiving module, configured to receive identification information of M sensing signal measurement devices sent by the SF, where M is a natural number.

Optionally, the apparatus 700 for establishing a sensing service sharing channel further includes:

- a third sending module, configured for the first RAN to send a second sensing service establishment request message to each of the M sensing signal measurement devices, where the second sensing service establishment request message is used to indicate each sensing signal measurement device to establish a sensing measurement data transmission channel with the first RAN separately; and
- a fourth receiving module, configured to receive a second sensing service establishment response message sent by each sensing signal measurement device.

Optionally, in a case that the M sensing signal measurement devices include a sensing signal measurement terminal device UE, a sensing measurement data transmission channel established by the sensing UE is a data radio bearer corresponding to the sensing UE; or

- in a case that the M sensing signal measurement devices include a second RAN, a sensing measurement data transmission channel established by the second RAN is an interface channel between the second RAN and the first RAN.

Optionally, the apparatus 700 for establishing a sensing service sharing channel further includes:

- a fifth receiving module, configured to receive sensing measurement data that is of T sensing services and that is sent by P sensing signal measurement devices, where P is a positive integer, P is less than or equal to M, T is a positive integer, and T is less than or equal to K; and
- a fourth sending module, configured to send the sensing measurement data of the T sensing services to the SF through the sensing service sharing channel.

Optionally, the apparatus 700 for establishing a sensing service sharing channel further includes:

- a first determining module, configured to determine the SSID corresponding to each piece of sensing measurement data; and
- a fifth sending module, configured to send the SSID corresponding to each piece of sensing measurement data to the SF through the sensing service sharing channel.

Optionally, the first determining module is configured to: receive the SSID corresponding to each piece of sensing measurement data sent by each of the P sensing signal measurement devices.

Optionally, the apparatus 700 for establishing a sensing service sharing channel further includes:

- a second determining module, configured to: based on the SSID corresponding to each piece of sensing measurement data, determine identification information corresponding to an SF that corresponds to the SSID corresponding to each piece of sensing measurement data; and
- a third determining module, configured to determine the sensing service sharing channel based on the identification information corresponding to the SF.

Optionally, the apparatus 700 for establishing a sensing service sharing channel further includes:

- a sixth receiving module, configured to receive a sensing service deletion request message sent by the SF, where the sensing service deletion request message includes the identification information corresponding to the SF;

a deletion module, configured to delete the sensing service sharing channel in response to the sensing service deletion request message; and a sixth sending module, configured to send a sensing service deletion response message to the SF, where the sensing service deletion response message is used to indicate whether the sensing service sharing channel is deleted successfully.

Figure 8:
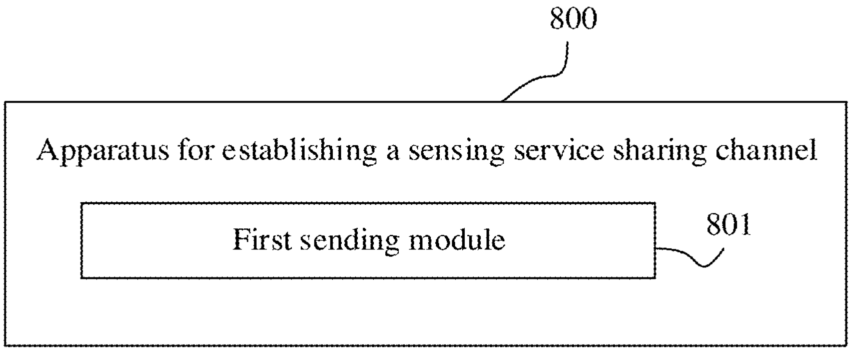
FIG. 8 is a second schematic diagram of a structure of an apparatus for establishing a sensing service sharing channel according to an embodiment of this application.

FIG. 8 is a second schematic diagram of a structure of an apparatus for establishing a sensing service sharing channel according to an embodiment of this application. As shown in FIG. 8, an apparatus 800 for establishing a sensing service sharing channel is applied to an SF and includes:

a first sending module 801, configured to send a first sensing service establishment request message to a first RAN, where the first sensing service establishment request message includes identification information corresponding to the SF; the first sensing service establishment request message is used to indicate the first RAN to establish a sensing service sharing channel between the SF and the first RAN; the sensing service sharing channel is used to transmit sensing measurement data of K sensing services between the SF and the first RAN; and K is a positive integer.

Based on the apparatus for establishing a sensing service sharing channel provided by this embodiment of this application, the first RAN is indicated to establish a sensing service sharing channel at a device granularity. The sensing service sharing channel is not only corresponding to a specific sensing service, but can be used to transmit sensing measurement data of a plurality of sensing services between the SF and the first RAN. In other words, the first RAN can transmit the sensing measurement data of the plurality of sensing services to the SF through the sensing service sharing channel. In this way, a problem of redundant establishment of measurement data transmission channels for different sensing services in current technologies is resolved. In this way, network resources are saved and network resource utilization is improved.

Optionally, the apparatus 800 for establishing a sensing service sharing channel further includes:

a seventh receiving module, configured to receive the first sensing service establishment response message sent by the first RAN, where the first sensing service establishment response message is used to indicate whether the sensing service sharing channel is successfully established.

Optionally, the first sensing service establishment response message includes at least one of the following:

identification information corresponding to the first RAN;

first indication information, used to indicate whether the sensing service sharing channel is successfully established; or second indication information, used to indicate whether the sensing service is accepted or successfully executed by a sensing device serving the sensing service.

Optionally, the identification information corresponding to the first RAN includes tunnel endpoint identification information of the first RAN and/or IP address information of the first RAN.

Optionally, the identification information corresponding to the SF includes tunnel endpoint identification information of the SF and/or IP address information of the SF.

Optionally, the apparatus 800 for establishing a sensing service sharing channel further includes:

an eighth receiving module, configured to receive a sensing service request message sent by a consumer device, where the sensing service request message includes information of a sensing object of the sensing service.

Optionally, the sensing service request message further includes sensing service description information.

Optionally, the apparatus 800 for establishing a sensing service sharing channel further includes:

a fourth determining module, configured for the SF to determine, based on the sensing service request message, the sensing device serving the sensing service, where the sensing device includes:

M sensing signal measurement devices; or

M sensing signal measurement devices and N sensing signal sending devices, where both M and N are natural numbers.

Optionally, the apparatus 800 for establishing a sensing service sharing channel further includes:

a fifth determining module, configured for the SF to determine, based on the sensing service request message, the first RAN used to transmit the sensing measurement data of the sensing service.

Optionally, the fifth determining module is configured to:

determine, based on the sensing object of the sensing service, the first RAN used to transmit the sensing measurement data of the sensing service, where the first RAN is capable of serving the sensing object; or determine, based on the sensing device of the sensing service, the first RAN used to transmit the sensing measurement data of the sensing service, where the first RAN is capable of serving the sensing device.

Optionally, the apparatus 800 for establishing a sensing service sharing channel further includes:

a second establishment module, configured to establish a corresponding sensing session with the sensing service based on the sensing service request message, and determine sensing session identification information SSID of the sensing session.

Optionally, the first sensing service establishment request message further includes an SSID list.

The SSID list includes an SSID of the sensing session. The SSID list includes L SSIDs, and one SSID corresponds to one sensing service. L is a positive integer.

Optionally, the apparatus 800 for establishing a sensing service sharing channel further includes:

a seventh sending module, configured to send a sensing service control message to the M sensing signal measurement devices separately, where the sensing service control message includes an SSID of the sensing session.

Optionally, the apparatus 800 for establishing a sensing service sharing channel further includes:

an eighth sending module, configured to send the identification information of the M sensing signal measurement devices to the first RAN.

Optionally, the apparatus 800 for establishing a sensing service sharing channel further includes:

a ninth sending module, configured to send a sensing resource configuration message to each of the N sensing signal sending devices, where the sensing resource configuration message includes an SSID of a sensing session corresponding to the sensing service.

Optionally, the apparatus 800 for establishing a sensing service sharing channel further includes:

a ninth receiving module, configured to receive sensing measurement data of T sensing services and an SSID corresponding to each piece of sensing measurement data that are sent by the first RAN through the sensing service sharing channel, where T is a positive integer, and T is less than or equal to K; and a classification module, configured to classify and associate each piece of sensing measurement data based on the SSID corresponding to each piece of sensing measurement data, to obtain the sensing measurement data of the T sensing services.

Optionally, the apparatus 800 for establishing a sensing service sharing channel further includes:

an obtaining module, configured to obtain a sensing service analysis result of each of the T sensing services based on the sensing measurement data of the T sensing services.

Optionally, the apparatus 800 for establishing a sensing service sharing channel further includes:

a tenth sending module, configured to send the sensing measurement data and/or the sensing service analysis result of each of the T sensing services correspondingly to a consumer device corresponding to each of the sensing services.

Optionally, the apparatus 800 for establishing a sensing service sharing channel further includes:

an eleventh sending module, configured to send the sensing measurement data of each of the T sensing services correspondingly to a consumer device corresponding to each of the sensing services.

Optionally, the apparatus 800 for establishing a sensing service sharing channel further includes:

a twelfth sending module, configured to send a sensing service deletion request message to the first RAN, where the sensing service deletion request message includes the identification information corresponding to the SF; and the sensing service deletion request message is used to indicate the first RAN to delete the sensing service sharing channel between the SF and the first RAN; and a tenth receiving module, configured to receive a sensing service deletion response message sent by the first RAN, where the sensing service deletion response message is used to indicate whether the sensing service sharing channel is deleted successfully.

Figure 9:
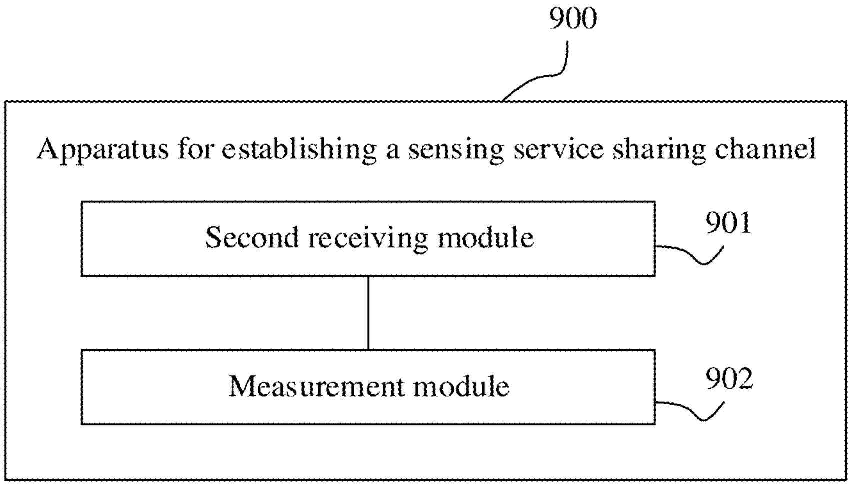
FIG. 9 is a third schematic diagram of a structure of an apparatus for establishing a sensing service sharing channel according to an embodiment of this application.

FIG. 9 is a third schematic diagram of a structure of an apparatus for establishing a sensing service sharing channel according to an embodiment of this application. As shown in FIG. 9, an apparatus 900 for establishing a sensing service sharing channel is applied to a sensing signal measurement device and includes:

a second receiving module 901, configured to receive a sensing service control message sent by an SF, where the sensing service control message includes an SSID of a sensing session corresponding to a sensing service; and a measurement module 902, configured to measure a sensing signal based on the sensing service control message, to obtain sensing measurement data of the sensing service.

In the apparatus for establishing a sensing service sharing channel provided in this embodiment of this application, the SF sends the sensing service control message to the sensing signal measurement device. The sensing service control message includes the SSID of the sensing session corresponding to the sensing service, to indicate the sensing signal measurement device to measure the sensing signal for the sensing service.

Optionally, the apparatus 900 for establishing a sensing service sharing channel further includes:

an eleventh receiving module, configured to receive a second sensing service establishment request message sent by a first RAN, where the second sensing service establishment request message is used to indicate the sensing signal measurement device to establish a sensing measurement data transmission channel with the first RAN;

a third establishment module, configured to establish the sensing measurement data transmission channel in response to the second sensing service establishment request message; and a thirteenth sending module, configured to send a second sensing service establishment response message to the first RAN.

Optionally, the apparatus 900 for establishing a sensing service sharing channel further includes:

a fourteenth sending module, configured to send, to the first RAN through the sensing measurement data transmission channel, the sensing measurement data of the sensing service and an SSID corresponding to the sensing measurement data.

The apparatus for establishing a sensing service sharing channel according to this embodiment of this application can implement all processes implemented in the method embodiments shown in FIG. 3 to FIG. 9. To avoid repetition, details are not described herein again.

The apparatus for establishing a sensing service sharing channel in this embodiment of this application may be an electronic device or a component in the electronic device, for example, an integrated circuit or a chip. The electronic device may be a terminal or a device other than the terminal. For example, the electronic device may be a mobile phone, a tablet computer, a notebook computer, a palmtop computer, a vehicular electronic device, an MID, an AR/VR device, a robot, a wearable device, a UMPC, a netbook, a PDA, or the like, or may be a server, a network attached storage (NAS), a PC, a television TV, a teller machine, a self-service machine, or the like. This is not limited in this embodiment of this application.

The apparatus for establishing a sensing service sharing channel in this embodiment of this application may be an apparatus with an operating system. The operating system may be an android operating system, may be an ios operating system, or may be another possible operating system. This is not limited in this embodiment of this application.

Figure 10:
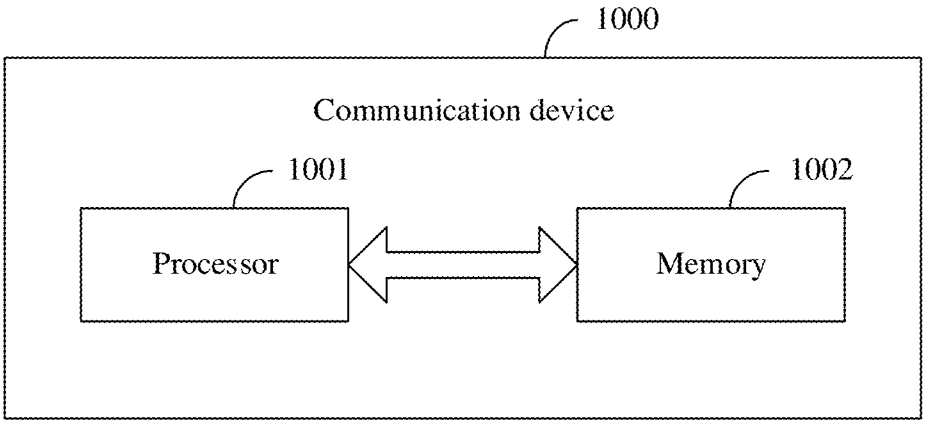
FIG. 10 is a schematic diagram of a structure of a communication device according to an embodiment of this application.

FIG. 10 is a schematic diagram of a structure of a communication device according to an embodiment of this application. As shown in FIG. 10, a communication device 1000 includes a processor 1001 and a memory 1002. A program or an instruction is stored in the memory 1002 and executable on the processor 1001. For example, when the communication device 1000 is a first radio access network, and the program or the instruction is executed by the processor 1001, steps in the embodiment for the method for establishing a sensing service sharing channel shown in FIG. 3 are performed, and the same technical effects can be achieved. When the communication device 1000 is a sensing function, and the program or instruction is executed by the processor 1001, the steps in the embodiment for the method for establishing a sensing service sharing channel shown in FIG. 4 are performed, and the same technical effects can be achieved. When the communication device 1000 is a sensing signal measurement device, and the program or instruction is executed by the processor 1001, the steps in the embodiment for the method for establishing a sensing service sharing channel shown in FIG. 5 are performed, and the same technical effects can be achieved. To avoid repetition, details are not described herein again.

An embodiment of this application provides a first radio access network, including a processor and a communication interface.

The communication interface is configured to receive a first sensing service establishment request message sent by a sensing function SF. The first sensing service establishment request message includes identification information corresponding to the SF.

The processor is configured to establish a sensing service sharing channel in response to the first sensing service establishment request message. The sensing service sharing channel is used to transmit sensing measurement data of K sensing services between the SF and the first RAN. K is a positive integer.

The embodiment of the first radio access network corresponds to the method embodiment on the side of the first radio access network. Each implementation process and implementation of the method embodiment can be applied to the embodiment of the first radio access network, and the same technical effects can be achieved.

An embodiment of this application provides a sensing function, including a processor and a communication interface.

The communication interface is configured to send a first sensing service establishment request message to a first RAN. The first sensing service establishment request message includes identification information corresponding to the SF. The first sensing service establishment request message is used to indicate the first RAN to establish a sensing service sharing channel between the SF and the first RAN. The sensing service sharing channel is used to transmit sensing measurement data of K sensing services between the SF and the first RAN. K is a positive integer.

The embodiment of the sensing function corresponds to the method embodiment on the side of the sensing function. Each implementation process and implementation of the method embodiment can be applied to the embodiment of the sensing function, and the same technical effects can be achieved.

An embodiment of this application provides a sensing signal measurement device, including a processor and a communication interface.

The communication interface is configured to receive a sensing service control message sent by a sensing function SF. The sensing service control message includes sensing session identification information SSID of a sensing session corresponding to a sensing service.

The processor is configured to measure a sensing signal based on the sensing service control message, to obtain sensing measurement data of the sensing service.

The embodiment of the sensing signal measurement device corresponds to the method embodiment on the side of the sensing signal measurement device. Each implementation process and implementation of the method embodiment can be applied to the embodiment of the sensing signal measurement device, and the same technical effects can be achieved.

An embodiment of this application provides a system for establishing a sensing service sharing channel, including a first radio access network, a sensing function, and a sensing signal measurement device. The first radio access network may be configured to perform the steps in the method described in the method embodiment on the side of the first radio access network. The sensing function may be configured to perform the steps in the method described in the method embodiment on the side of the sensing function. The sensing signal measurement device may be configured to perform the steps in the method described in the method embodiment on the side of the sensing signal measurement device.

Figure 11:
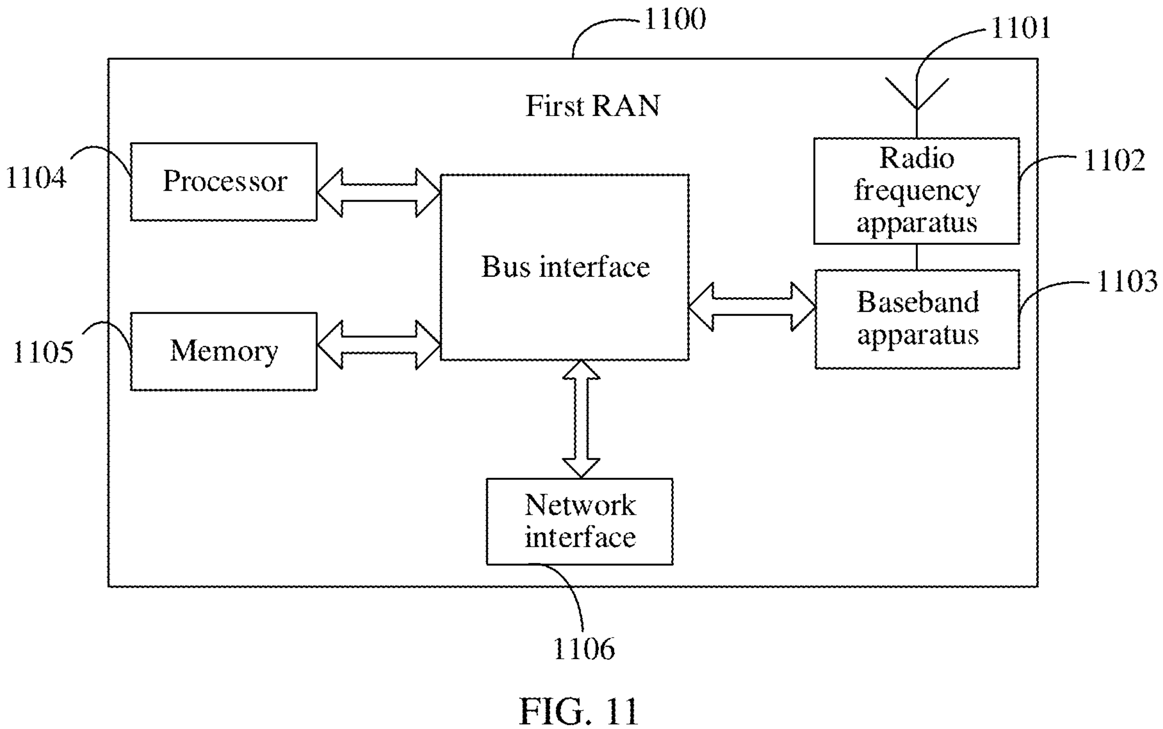
FIG. 11 is a schematic diagram of a structure of a first RAN according to an embodiment of this application.

FIG. 11 is a schematic diagram of a structure of a first RAN according to an embodiment of this application. As shown in FIG. 11, the first RAN 1100 includes an antenna 1101, a radio frequency apparatus 1102, a baseband apparatus 1103, a processor 1104, and a memory 1105. The antenna 1101 is connected to the radio frequency apparatus 1102. In an uplink direction, the radio frequency apparatus 1102 receives information through the antenna 1101 and sends the received information to the baseband apparatus 1103 for processing. In a downlink direction, the baseband apparatus 1103 processes to-be-sent information and sends the information to the radio frequency apparatus 1102. The radio frequency apparatus 1102 processes the received information and transmits the information through the antenna 1101.

The method performed by the first RAN in the foregoing embodiment may be implemented in the baseband apparatus 1103. The baseband apparatus 1103 includes a baseband processor.

The baseband apparatus 1103 may, for example, include at least one baseband plate on which a plurality of chips are provided. As shown in FIG. 11, one of the chips is, for example, a baseband processor, and is connected to the memory 1105 through a bus interface, to invoke a program in the memory 1105 and perform the network device operations shown in the foregoing method embodiments.

The first RAN may further include a network interface 1106. For example, the interface is a common public radio interface (CPRI).

Optionally, the first RAN 1100 according to this embodiment of this application further includes an instruction or a program that is stored in the memory 1105 and that is executable on the processor 1104. The processor 1104 invokes the instruction or program in the memory 1105 to execute the method executed by the modules shown in FIG. 7 and the same technical effects are achieved. To avoid repetition, details are not described herein again.

Figure 12:
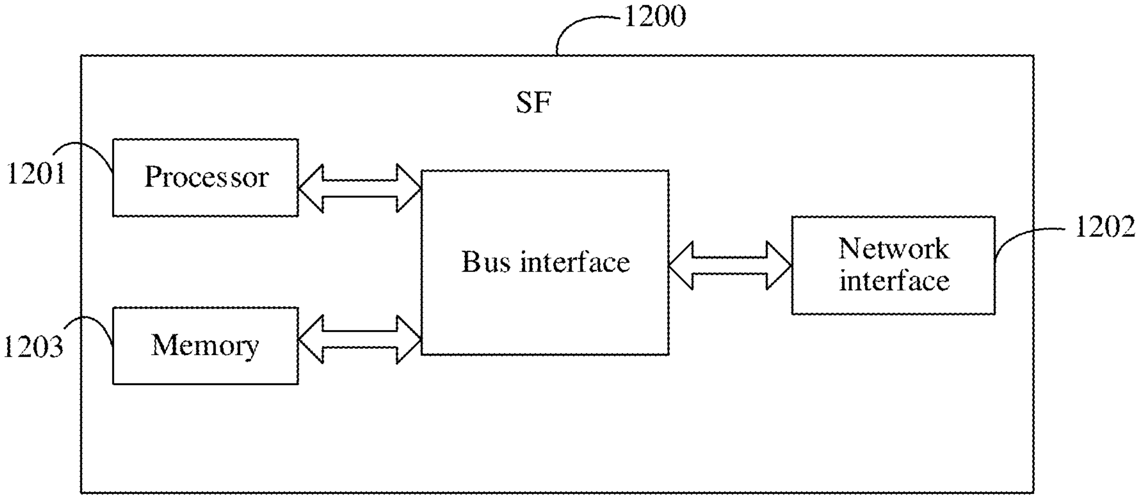
FIG. 12 is a schematic diagram of a structure of an SF according to an embodiment of this application.

FIG. 12 is a schematic diagram of a structure of an SF according to an embodiment of this application. As shown in FIG. 12, an SF 1200 includes: a processor 1201, a network interface 1202, and a memory 1203. The network interface 1202 is, for example, a common public radio interface (CPRI).

Optionally, the SF 1200 in this embodiment of the present application further includes: an instruction or a program that is stored in the memory 1203 and that is executable on the processor 1201. The processor 1201 invokes the instruction or program in the memory 1203 to execute the method executed by the modules shown in FIG. 8, and the same technical effects can be achieved. To avoid repetition, details are not described herein again.

An embodiment of this application further provides a non-transitory readable storage medium. The non-transitory readable storage medium stores a program or an instruction. When the program or the instruction is executed by a processor, the processes of the foregoing method embodiments for establishing a sensing service sharing channel are implemented and the same technical effects are achieved. To avoid repetition, details are not described herein again.

The processor is the processor in the terminal in the foregoing embodiments. The non-transitory readable storage medium includes a non-transitory computer-readable storage medium, for example, a computer read only memory ROM, a random access memory RAM, a magnetic disk, an optical disk, and the like.

An embodiment of this application further provides a chip. The chip includes a processor and a communication interface. The communication interface and the processor are coupled. The processor is configured to run a program or an instruction, so that the processes of the foregoing method embodiments for establishing a sensing service sharing channel are implemented and the same technical effects are achieved. To avoid repetition, details are not described herein again.

It should be understood that the chip mentioned in this embodiment of this application may also be referred to as system on chip, system-on-chip, System on Chip, SoC, or the like.

An embodiment of this application further provides a computer program/program product. The computer program/program product is stored in a non-transitory storage medium. The computer program/program product is executed by at least one processor, so that the processes of the foregoing method embodiments for establishing a sensing service sharing channel are implemented and the same technical effects are achieved. To avoid repetition, details are not described herein again.

It should be noted that, in this specification, the terms "include", "comprise", and any variation thereof are intended to cover a non-exclusive inclusion. Therefore, a process, a method, an object, or an apparatus that includes a series of elements not only includes such elements, but also includes other elements not specified expressly, or may include inherent elements of the process, the method, the object, or the apparatus. Without more limitations, elements defined by the sentence "including one" does not exclude a case in which there are still other same elements in the process, method, object, or apparatus. It should be noted that the scope of the methods and apparatuses in embodiments of this application is not limited to the shown or discussed orders in which the functions are implemented. Alternatively, depending on the functions, the functions maybe performed in a substantially simultaneous manner or in a reverse order. For example, the described methods may be performed in an order different from the described order, and various steps may be added, omitted, or combined. In addition, features described with reference to some examples may be combined in other examples.

According to the descriptions in the foregoing implementations, a person skilled in the art may clearly learn that the method according to the foregoing embodiments may be implemented by relying on software and a commodity hardware platform or by using hardware. Based on such an understanding, the technical solutions of this application essentially, or the part contributing to the prior art, may be presented in a form of a computer software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in embodiments of this application.

Embodiments of this application are described above with reference to the accompanying drawings. This application is not limited to the embodiments described above, and the embodiments described above are merely examples but not limitations. A person of ordinary skill in the art may make various variations under the teaching of this application without departing from the purpose of this application and the protection scope of the claims, and such variations shall all fall within the protection scope of this application.

What is claimed is:

1. A method for establishing a sensing service sharing channel, comprising:

receiving, by a first radio access network (RAN), a first sensing service establishment request message sent by a sensing function (SF), wherein the first sensing service establishment request message comprises identification information corresponding to the SF; and establishing, by the first RAN, the sensing service sharing channel in response to the first sensing service establishment request message, wherein the sensing service sharing channel is used to transmit sensing measurement data of K sensing services between the SF and the first RAN, and K is a positive integer;

wherein the method further comprises:

receiving, by the first RAN, identification information of M sensing signal measurement devices sent by the SF, wherein M is a natural number;

wherein the method further comprises:

sending, by the first RAN, a second sensing service establishment request message to each of the M sensing signal measurement devices, wherein the second sensing service establishment request message is used to indicate each sensing signal measurement device to establish a sensing measurement data transmission channel with the first RAN separately; and receiving, by the first RAN, a second sensing service establishment response message sent by the each sensing signal measurement device.

2. The method for establishing a sensing service sharing channel according to claim 1, wherein the method further comprises:

sending, by the first RAN, a first sensing service establishment response message to the SF, wherein the first sensing service establishment response message is used to indicate whether the sensing service sharing channel is successfully established.

3. The method for establishing a sensing service sharing channel according to claim 2, wherein the first sensing service establishment response message comprises at least one of the following:

identification information corresponding to the first RAN;

first indication information, used to indicate whether the sensing service sharing channel is successfully established; or second indication information, used to indicate whether the sensing service is accepted or successfully executed by a sensing device serving the sensing service;

wherein the identification information corresponding to the first RAN comprises tunnel endpoint identification information of the first RAN and/or IP address information of the first RAN.

4. The method for establishing a sensing service sharing channel according to claim 1, wherein the first sensing service establishment request message further comprises a sensing session identification information (SSID) list, wherein the SSID list comprises L SSIDs, and one SSID corresponds to one sensing service, and L is a positive integer.

5. A first radio access network, comprising a processor and a memory, wherein a program or an instruction is stored in the memory and executable on the processor, and when the program or the instruction is executed by the processor, steps of the method for establishing a sensing service sharing channel are implemented according to claim 1.

6. The method for establishing a sensing service sharing channel according to claim 1, wherein in a case that the M sensing signal measurement devices comprise a sensing signal measurement terminal device, a sensing measurement data transmission channel established by the sensing terminal device is a data radio bearer corresponding to the sensing terminal device; or in a case that the M sensing signal measurement devices comprise a second RAN, a sensing measurement data transmission channel established by the second RAN is an interface channel between the second RAN and the first RAN.

7. The method for establishing a sensing service sharing channel according to claim 1, wherein the method further comprises:

receiving, by the first RAN, sensing measurement data that is of T sensing services and that is sent by P sensing signal measurement devices, wherein P is a positive integer, P is less than or equal to M, T is a positive integer, and T is less than or equal to K; and sending, by the first RAN, the sensing measurement data of the T sensing services to the SF through the sensing service sharing channel;

wherein the method further comprises:

determining, by the first RAN, a sensing session identification information (SSID) corresponding to each piece of the sensing measurement data; and sending, by the first RAN, the SSID corresponding to each piece of the sensing measurement data to the SF through the sensing service sharing channel.

8. The method for establishing a sensing service sharing channel according to claim 7, wherein the determining, by the first RAN, an SSID corresponding to each piece of the sensing measurement data comprises:

receiving, by the first RAN, an SSID corresponding to each piece of sensing measurement data sent by each of the P sensing signal measurement devices;

or, the method further comprises:

based on the SSID corresponding to each piece of the sensing measurement data, determining, by the first RAN, identification information corresponding to an SF that corresponds to the SSID corresponding to each piece of the sensing measurement data; and determining, by the first RAN, the sensing service sharing channel based on the identification information corresponding to the SF that corresponds to the SSID corresponding to each piece of the sensing measurement data.

9. The method for establishing a sensing service sharing channel according to claim 1, wherein the method further comprises:

receiving, by the first RAN, a sensing service deletion request message sent by the SF, wherein the sensing service deletion request message comprises the identification information corresponding to the SF;

deleting, by the first RAN, the sensing service sharing channel in response to the sensing service deletion request message; and sending, by the first RAN, a sensing service deletion response message to the SF, wherein the sensing service deletion response message is used to indicate whether the sensing service sharing channel is deleted successfully.

10. A method for establishing a sensing service sharing channel, comprising:

sending, by a sensing function (SF), a first sensing service establishment request message to a first radio access network (RAN), wherein the first sensing service establishment request message comprises identification information corresponding to the SF; the first sensing service establishment request message is used to indicate the first RAN to establish the sensing service sharing channel between the SF and the first RAN; and the sensing service sharing channel is used to transmit sensing measurement data of K sensing services between the SF and the first RAN, wherein K is a positive integer;

wherein the method further comprises:

sending, by the SF, identification information of M sensing signal measurement devices to the first RAN, wherein M is a natural number;

wherein the identification information of the M sensing signal measurement devices is used by the first RAN to determine the M sensing signal measurement devices that the first RAN sends a second sensing service establishment request message to, wherein the second sensing service establishment request message is used to indicate each sensing signal measurement device of the M sensing signal measurement devices to establish a sensing measurement data transmission channel with the first RAN separately.

11. The method for establishing a sensing service sharing channel according to claim 10, wherein the method further comprises:

receiving, by the SF, a sensing service request message sent by a consumer device, wherein the sensing service request message comprises information of a sensing object of the sensing service.

12. The method for establishing a sensing service sharing channel according to claim 11, wherein the method further comprises:

determining, by the SF based on the sensing service request message, a sensing device serving the sensing service, wherein the sensing device comprises:

the M sensing signal measurement devices; or the M sensing signal measurement devices and N sensing signal sending devices, wherein both M and N are natural numbers.

13. The method for establishing a sensing service sharing channel according to claim 12, wherein the method further comprises:

determining, by the SF based on the sensing service request message, the first RAN used to transmit sensing measurement data of the sensing service;

wherein the determining, by the SF based on the sensing service request message, the first RAN used to transmit sensing measurement data of the sensing service comprises:

determining, by the SF based on the sensing object of the sensing service, the first RAN used to transmit the sensing measurement data of the sensing service, wherein the first RAN is capable of serving the sensing object; or determining, by the SF based on the sensing device of the sensing service, the first RAN used to transmit the sensing measurement data of the sensing service, wherein the first RAN is capable of serving serve the sensing device.

14. The method for establishing a sensing service sharing channel according to claim 12, wherein the method further comprises:

establishing, by the SF, a corresponding sensing session with the sensing service based on the sensing service request message, and determining a sensing session identification information (SSID) of the sensing session;

wherein the method further comprises:

sending, by the SF, a sensing service control message to the M sensing signal measurement devices separately, wherein the sensing service control message comprises the SSID of the sensing session.

15. The method for establishing a sensing service sharing channel according to claim 12, wherein the method further comprises:

sending, by the SF, a sensing resource configuration message to each of the N sensing signal sending devices, wherein the sensing resource configuration message comprises a sensing session identification information (SSID) of a sensing session corresponding to the sensing service;

wherein the method further comprises:

receiving, by the SF, sensing measurement data of T sensing services and an SSID corresponding to each piece of sensing measurement data that are sent by the first RAN through the sensing service sharing channel, wherein T is a positive integer, and T is less than or equal to K; and classifying and associating, by the SF, the each piece of sensing measurement data based on the SSID corresponding to the each piece of sensing measurement data, to obtain the sensing measurement data of the T sensing services.

16. The method for establishing a sensing service sharing channel according to claim 15, wherein the method further comprises:

obtaining, by the SF, a sensing service analysis result of each of the T sensing services based on the sensing measurement data of the T sensing services;

sending, by the SF, the sensing measurement data and/or the sensing service analysis result of each of the T sensing services correspondingly to a consumer device corresponding to each of the sensing services;

or, the method further comprises:

sending, by the SF, the sensing measurement data of each of the T sensing services correspondingly to a consumer device corresponding to each of the sensing services.

17. A sensing function, comprising a processor and a memory, wherein a program or an instruction is stored in the memory and executable on the processor, and when the program or the instruction is executed by the processor, steps of the method for establishing a sensing service sharing channel are implemented according to claim 10.

18. A method for establishing a sensing service sharing channel, comprising:

receiving, by a sensing signal measurement device, a sensing service control message sent by a sensing function (SF), wherein the sensing service control message comprises a sensing session identification information (SSID) of a sensing session corresponding to a sensing service; and measuring, by the sensing signal measurement device, a sensing signal based on the sensing service control message, to obtain sensing measurement data of the sensing service;

wherein the method further comprises:

receiving, by the sensing signal measurement device, a second sensing service establishment request message sent by a first access network device (RAN), wherein the second sensing service establishment request message is used to indicate the sensing signal measurement device to establish a sensing measurement data transmission channel with the first RAN;

establishing, by the sensing signal measurement device, the sensing measurement data transmission channel in response to the second sensing service establishment request message; and sending, by the sensing signal measurement device, a second sensing service establishment response message to the first RAN.

19. A sensing signal measurement device, comprising a processor and a memory, wherein a program or an instruction is stored in the memory and executable on the processor, and when the program or the instruction is executed by the processor, steps of the method for establishing a sensing service sharing channel are implemented according to claim 18.

* * * * *